United States Patent [19]
Mayer et al.

[11] Patent Number: 5,898,564
[45] Date of Patent: *Apr. 27, 1999

[54] CAPACITOR WITH A COMPOSITE CARBON FOAM ELECTRODE

[75] Inventors: Steven T. Mayer, San Leandro; Richard W. Pekala, Pleasant Hill; James L. Kaschmitter, Pleasanton, all of Calif.

[73] Assignee: Regents of the University of California, Oakland, Calif.

[ * ] Notice: This patent is subject to a terminal disclaimer.

[21] Appl. No.: 08/760,852

[22] Filed: Dec. 2, 1996

Related U.S. Application Data

[62] Division of application No. 08/393,588, Feb. 21, 1995, Pat. No. 5,626,977.

[51] Int. Cl.⁶ ........................................................ H01G 9/04
[52] U.S. Cl. ........................ 361/508; 361/516; 361/528; 361/532; 429/44
[58] Field of Search ............................ 361/502, 508–509, 361/516, 523, 528–529, 532; 502/180, 182; 429/44

[56] References Cited

U.S. PATENT DOCUMENTS 4,806,290  2/1989  Hopper et al. .............................. 264/28
5,260,855  11/1993  Kaschmitter et al. ................... 361/502
5,476,878  12/1995  Pekala ....................................... 521/61

*Primary Examiner*—Kristine Kincaid
*Assistant Examiner*—Anthony Dinkins
*Attorney, Agent, or Firm*—L. E. Carnahan

[57] ABSTRACT

Carbon aerogels used as a binder for granularized materials, including other forms of carbon and metal additives, are cast onto carbon or metal fiber substrates to form composite carbon thin film sheets. The thin film sheets are utilized in electrochemical energy storage applications, such as electrochemical double layer capacitors (aerocapacitors), lithium based battery insertion electrodes, fuel cell electrodes, and electrocapacitive deionization electrodes. The composite carbon foam may be formed by prior known processes, but with the solid partides being added during the liquid phase of the process, i.e. prior to gelation. The other forms of carbon may include carbon microspheres, carbon powder, carbon aerogel powder or particles, graphite carbons. Metal and/or carbon fibers may be added for increased conductivity. The choice of materials and fibers will depend on the electrolyte used and the relative trade off of system resistivity and power to system energy.

13 Claims, 1 Drawing Sheet

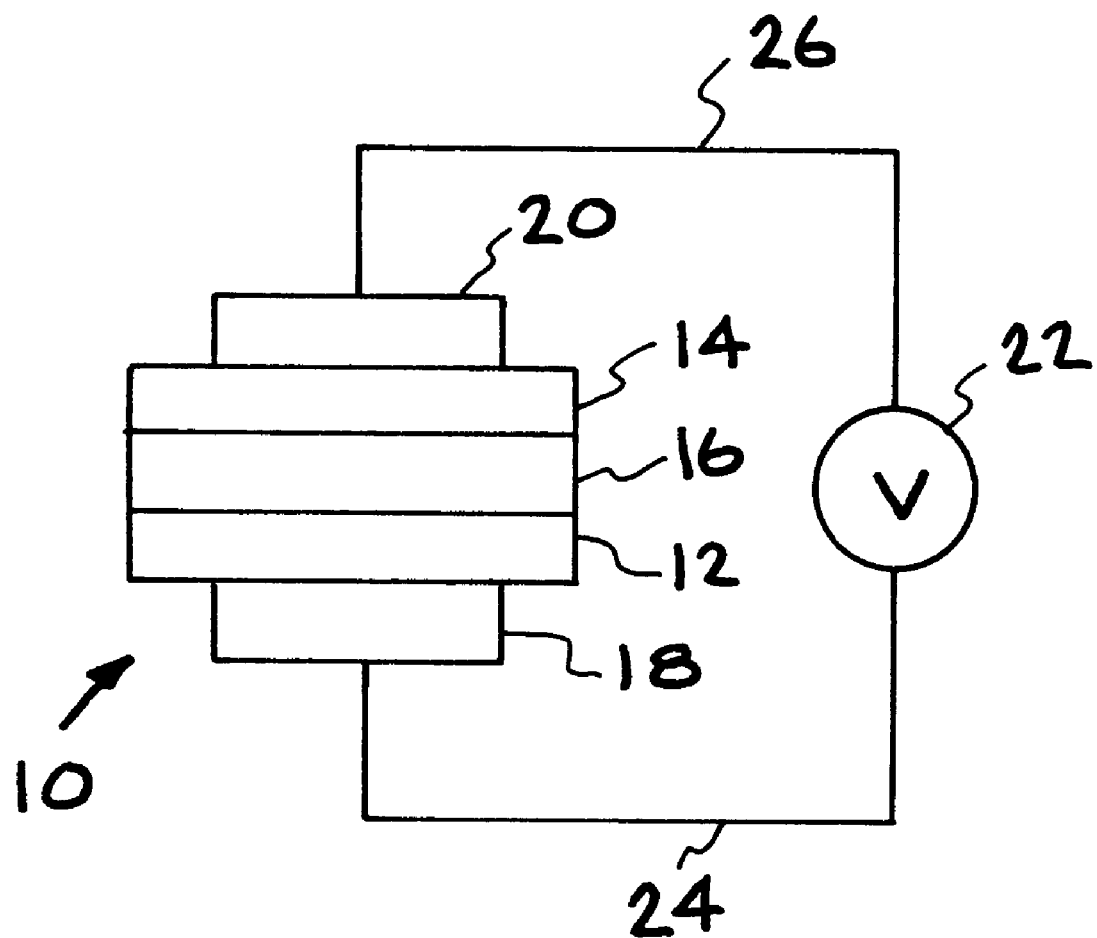

CAPACITOR WITH A COMPOSITE CARBON FOAM ELECTRODE

This is a division of U.S. application Ser. No. 08/393,588 filed Feb. 21, 1995, now U.S. Pat. No. 5,626,977 issued May 6, 1997.

The United States Government has rights in this invention pursuant to Contract No. W-7405-ENG48 between the United States Department of Energy and the University of California for the operation of Lawrence Livermore National Laboratory.

BACKGROUND OF THE INVENTION

The present invention is directed to the use of aerogels, particularly to carbon aerogel electrodes, and more particularly to a composite carbon foam electrode and method of fabrication wherein solid carbon, carbon aerogel, or metal particles are added during the process.

Aerogels, carbon aerogels, and carbon foams have been produced by various methods for a variety of applications. These prior processes are exemplified by U.S. Pat. No. 4,806,290 issued Feb. 21, 1989 to R. W. Hopper et al; U.S. Pat. No. 4,873,218 issued Oct. 10, 1989 to R. W. Pekala; U.S. Pat. No. 4,997,804 issued Mar. 5, 1991 to R. W. Pekala; U.S. Pat. No. 5,086,085 issued Feb. 4, 1992 to R. W. Pekala; and U.S. Pat. No. 5,252,620 issued Oct. 12, 1993 to J. R. Elliott, Jr. et al. Recently, efforts have been directed to the development of carbon foams for use as electrodes and include all forms of carbon foams, monolithic, granular or microspheres. Such electrodes find use in energy storage devices, i.e. capacitors and batteries, as well as for fuel cells and electrocapacitive deionization devices, etc. These efforts are exemplified by U.S. Pat. No. 5,260,855 issued Nov. 9, 1993 to J. L. Kaschmitter et al., and U.S. application Ser. No. 08/036,740 filed Mar. 25, 1993, entitled "Carbon Foams For Energy Storage Devices", now U.S. Pat. No. 5,529,971 issued Jun. 25, 1996; Ser. No. 08/041,503 filed Apr. 1, 1993, entitled "Method Of Low Pressure And/Or Evaporated Drying Of Aerogel", now U.S. Pat. No. 5,420,168 issued May 20, 1995; and Ser. No. 08/089,119 filed Jul. 8, 1993, entitled "Organic Aerogel Microspheres And Fabrication Method Therefor", now U.S. Pat. No. 5,508,341 issued Apr. 16, 1996.

It has been discovered by the present invention that manufacturability and performance of these prior carbon foams for electrode applications can be enhanced by using these prior materials as particles with a carbon foam binder to form a composite electrode. Manufacturability would be enhanced by allowing precursor materials to be spread in very thin films or as thin films on roll to roll substrates. Also, performance could be further enhanced by mixing other high performance carbons, in particulate form with the precursor, prior to firing. Thus, this invention provides a composite carbon foam electrode and method for fabricating same.

SUMMARY OF THE INVENTION

It is an object of the present invention to provide a carbon foam electrode.

A further object of the invention is to provide a composite carbon foam electrode.

A further object of the invention is to provide a method for fabricating composite carbon foam electrodes.

Another object of the invention is to provide a composite carbon foam electrode having therein granularized materials including other forms of carbon and metal additives, such as carbon microsphere, carbon foam particles, carbon powders, and carbon and/or metal fibers.

Another object of the invention is to provide a method for producing composite carbon foam electrodes which involves a modification of prior known methods by adding granularized materials during the phase of the process that the precursor materials are still liquids (i.e. prior to gelation), and allowing the precursor materials to be spread in very thin films on roll to roll substrates.

Other objects and advantages will become apparent from the following description and accompanying drawing. Basically, the invention comprises a composite carbon foam electrode in which is incorporated granularized materials and a method of fabricating same. Choice of materials and fibers to be used in the composite electrode will depend on the electrolyte used and the relative trade off of system resistivity and power to system energy. Metal and/or carbon fibers may be added for increased conductivity, such may include nickel, stainless steel, aluminum, carbon, electroplated carbon fiber, etc. The granularized materials, solid particles, or microspheres added to the precursor materials may include: 1) carbon aerogel microspheres, 2) crushed/powderized carbon aerogel, 3) powderized activated or non-activated carbon or any other source type, and 4) metal and/or metal oxide powders or spheres. The method for fabrication is generally similar to the methods of the above referenced patents and copending applications except that the granularized materials are added during the phase where the precursor materials are liquid (prior to gelation), and the precursor materials are spread in very thin films or as thin films on roll to roll substrates. The simplicity of manufacture over monolithic carbon aerogel production is significant. Improved capacities per volume and per weight may be achieved by applying this method when compared to thin film casting onto composite substrates. Performance could be further enhanced by mixing other high performance carbons, in particulate form, with the precursor, prior to pyrolysis.

BRIEF DESCRIPTION OF THE DRAWINGS

The accompanying drawing, which is incorporated into and forms a part of the disclosure, illustrates an embodiment of the invention and, together with the description, serve to explain the principles of the invention.

The single figure illustrates schematically a capacitor with composite carbon foam electrodes made in accordance with the invention.

DETAILED DESCRIPTION OF THE INVENTION

The present invention is directed to composite carbon foam electrodes and a method for fabricating same. Various processes have been developed to form thin film carbon electrodes, as pointed out above.

This invention primarily involves two methods using the RF aerogel. The first method is where the carbon aerogel constitutes a very large fraction of the total mass and volume of the end product, in which case, the aerogel is acting only as a high surface area support matrix to disperse a small fraction of a granular or powderous material, such as in fuel cell applications where electrocatalyst metals are added. The second method constitutes using the RF aerogel as a "binder" of another material: the RF aerogel is subsequently fired, to make it a conductive binder with high surface area. To make a composite double layer capacitor electrode, the material bound by the RF aerogel may be an already pyrolysed carbon aerogel powder or microsphere, or a powderized high surface area activated carbon. Added to this may be metal powder, to enhance the electrodes conductivity. The potential advantage of this technique is the avoidance of the shrinkage that occurs when using a monolithic aerogel, so one can cast the material to form. The advantage over using conventional binders is that the carbon aerogel binder is conductive (greatly increasing the resultant composite's conductivity with respect to polymer based binders such as Teflon, EDPM or PVDF), and is electrochemically active (the binder also has capacity, and adds to the total double layer capacitance).

Manufacturability and performance of these prior electrode materials is enhanced by using these prior materials as particles with a carbon foam binder, to form a composite electrode. Manufacturability is enhanced by eliminating the shrinkage that occurs with normal monolithic aerogels, and the difficulty associated with handling that shrinkage. Also, capacity is improved with respect to the standard RF impregnated carbon fiber process. The standard process results in a significantly lower density material than that disclosed in this application because the RF aerogel shrinks around the fibers during the pyrolysis, leaving a very open structure (probably as much as 60+% open), and that large of an open volume reduces the capacity on a volumetric basis (i.e. Farads/cc). The process of this invention using already fired powder (which of course has already shrunk) with a binder, can be potentially compressed to yield a composite which is 30% or less void. Manufacturability is also enhanced by allowing precursor materials to be spread in very thin films or as thin films on roll to roll substrates. Performance is enhanced by mixing other high performance carbons, in particulate form with the precursor prior to pyrolysis. The simplicity of manufacture over monolithic carbon aerogel production is significant. Improved capacities per volume and per weight may be achieved by applying this method when compared to thin film casting onto composite substrates.

As pointed out above various fabrication methods have been developed to produce aerogels of different composition, microcellular foams, microcellular carbon or catalytically impregnated carbon foams, carbon microsphere foams, as well as carbon foams particularly applicable as electrodes. These prior approaches include all forms of carbon foams, be they monolithic, granular or microspheres.

In the present invention carbon aerogels, derived from RF aerogels, may be used as a binder for a multitude of granularized materials, including other forms of carbon and metal additives, and can be cast to form thin films and onto carbon or metal fiber substrates, for example, to form composite carbon thin film sheets. These other forms of carbon may include carbon microspheres (aerogel or other type), carbon powders (activated or non-activated), carbon aerogel powder, or carbon foams, PAN carbon, PMAN carbon, graphitic carbons, etc. Carbon aerogel powders may also be used with traditional forms of binders, such as PTFE (Teflon), ethylene propylene dimmer (EPDM), polyvinylidene flouride (PVDF), and polymethyl methacrilate (PMMA) as well as other rubberized materials. Metal and/or carbon fibers may be added for increased conductivity, and may include nickel, stainless steel, aluminum, carbon, electroplated carbon fibers, etc. The thin film sheets are useful in electrochemical energy storage applications, such as electrochemical double layer capacitors (aerocapacitors), lithium based battery insertion electrodes, fuel cell electrodes, and electrocapacitive deionization electrodes. Choice of materials and fibers will depend on the electrolyte used and other system factors, such as the relative trade off between system resistivity and power to system energy.

As is known in the prior art, and exemplified by certain of the above-referenced U.S. patents and copending patent applications, a variety of 1:2 formaldehyde:resorcinol molar ratio formulations of resorcinol and formaldehyde can be mixed with sodium carbonate as a catalyst to produce resorcinol/formaldehyde (RF) aquagels, for example. These same chemicals can be processed in a number of different manners to produce various physical structure aquagels (e.g. monolithic in molds, monolithic cast in thin films, composite thin film on fiber substrates, emulsion polymerization to form microspheres, etc.). Subsequent pyrolysis in an inert atmosphere leads to formation of a carbonized aerogel material. In addition, the process for producing the aerogel material may include supercritical drying techniques such as disclosed in the above-referenced U.S. patents, as well as an air drying technique such as described and claimed in above-referenced application Ser. No. 08/041,503, now U.S. Pat. No. 5,420,168.

For the purposes of this invention, the previously disclosed processes used to form thin film electrodes can be combined with the addition of solid particulates or microspheres during the phase of the process that the components are still liquids (i.e. prior to gelation). The solid particles include, but are not limited to: 1) carbon aerogel microspheres, such as formed by the process of above-referenced U.S. application Ser. No. 08/089,119, now U.S. Pat. No. 5,508,341; 2) crushed/powderized carbon aerogel, such as made by the above referenced U.S. patents issued to R. W. Pekala and J. L. Kaschmitter; 3) powderized activated or non-activated carbon or any other source or type, and 4) metal and/or metal oxide powders or spheres.

The composite carbon foam electrode of this invention is described hereafter with respect to its utilization in capacitors having the capability of achieving very high energy density, and particularly for use in double layer capacitors utilizing a variety of forms of carbon foam electrodes, such as described and claimed in above-referenced U.S. Pat. No. 5,260,855, the difference being primarily in the addition of granularized material during the fabrication process; and the use of the electrode of this invention is not intended to be limited to capacitors.

A double layer capacitor, as generally known, has two electrical conductors between which a potential difference exists. The conductors are separated by an electrically insulating, ionically conducting material. In a typical capacitor, the conductors are electrically connected with an external power supply and are known as electrodes. Such a capacitor is illustrated schematically in the Figure, and indicated generally at 10, which is composed of a pair of spaced electrodes 12 and 14, made of composite carbon foam, and separated by an electrode separator 16 composed of an electrically insulating material. Electrical contacts 18 and 20 are in direct contact with electrodes 12 and 14, respectively, and are connected to a power supply or voltage source 22 by leads 24 and 26. The composite carbon foam electrodes 12 and 14 may, for example, have a density of about 0.1 g/cc to about 1.2 g/cc and surface area of 100–1200 $m^2/g$.

While the Figure illustrates a single double layer capacitor, multiple double layer capacitors may be fabricated utilizing a variety of forms of the composite carbon foam electrodes, made in accordance with the present invention, but similar to that disclosed in above-referenced U.S. Pat. No. 5,260,855. Also, as pointed out above, while the composite carbon foam electrode may be produced by modification of various prior known carbon foam electrode processes, the following description of the fabrication process, modified in accordance with the present invention, will utilize the process of above-referenced U.S. Pat. No. 5,260,855, and such is incorporated herein by reference.

Preparation of Carbon Aerogels

The process in general requires first that the reactants are mixed with a catalyst and may include the addition of metals. The reactants include resorcinol, phenol, catechol, phloroglucinol, and other polyhydroxybenzene compounds that react in the appropriate ratio with formaldehyde or furfural. Preferred combinations include resorcinol/furfural, resorcinol/formaldehyde, phenol-resorcinol/formaldehyde, catechol/formaldehyde, and phloroglucinol/formaldehyde. The selected powderized, granularized or microsphere materials described above are then mixed in a desired amount with the precursor materials while they are still liquid. The addition of the granularized material is exemplified hereinafter. A gel formed by polymerization is then spread in a thin film and dried in a solvent exchange and extraction step, or by air drying. The resulting organic aerogel is then pyrolyzed in an inert atmosphere to form a composite carbon aerogel.

Specifically, the process to prepare the gels proceeds through a solgel polymerization of certain multifunctional organic monomers in a solvent, typically water, leading to the formation of highly cross-linked, transparent gels impregnated with the desired granularized or solid particles. For example, in an embodiment, one mole of resorcinol (1,3-dihydroxybenzene) condenses in the presence of a basic catalyst with two moles of formaldehyde. Mildly basic catalysts such as sodium carbonate are preferred. In this polymerization, resorcinol is a trifunctional monomer capable of adding formaldehyde in the 2-,4-, and/or 6-ring positions. The substituted resorcinol rings condense with each other to form nanometersized clusters in solution. Eventually, the clusters cross-link through their surface groups (e.g., —$CH_2OH$) to form an aquagel. For a full explanation of the chemistry, see above-referenced U.S. Pat. No. 4,873,218 and U.S. Pat. No. 4,997,804.

The size of the clusters is regulated by the concentration of catalyst in the resorcinol/formaldehyde (RF) mixture. More specifically, the mole ratio of resorcinol (R) to catalyst (C), R/C, controls the surface area and electrochemical properties of the resulting gel. For example, in carbon foams made from gels having R/C of 100 and 200, the electrical conductivity increases significantly with increasing density. The densities of these foams are between about 0.1 g/cc and 0.6 g/cc.

The next step in aerogel preparation is to dry the aquagel. If the polymerization solvent is removed from these gels by simple evaporation, large capillary forces are exerted on the pores, forming a collapsed structure known as a xerogel. In order to preserve the gel skeleton and minimize shrinkage, the drying step is performed under supercritical conditions, such as described in above-referenced U.S. Pat. No. 5,260,855, or the drying step may be carried out by air drying as described in above-referenced application Ser. No. 08/041,503, now U.S. Pat. No. 5,420,168.

In the modified process of this invention, and prior to the drying operation, the gel containing the precursor materials and the selected solid particles, microspheres, fibers, etc. is first formed as a paste and then is spread in very thin films (thickness of 1 to 40 mil) or such films may be spread on selected substrates, composed of metal foil, carbon paper, or porous metal substrates, for example, or on roll to roll substrates. This is accomplished by first producing the powder/RF solution slurry or paste. To the solution, as formed as described above, is added a small amount of aerogel powder (between 0.1–20.0 cc of solution to 100 gm of carbon aerogel powder, granuals, microspheres, the amount of which will determine the strength, conductivity, density, and capacity of the resulting composite), and mixed, thereby forming a paste. The paste can then be rolled into a thin film (like one would roll a piece of dough, except that the thickness (1–40 mil) is metered. Also, the paste can be pressed into a carbon fiber cloth, similar to the standard process, or it can be placed into a metered mold and pressed to create an electrode of the desired form factor. The composite must be handled similar to all the other standard aerogel electrodes. Whereafter the RF gel or paste is heated and curved while covered so that the water in the pores does not evaporate, and then can be removed by exchange with acetone, followed by evaporation of the acetone, followed by pyrolysis.

The electrical conductivity of the composite aerogels produced as above described, is dependent on the composition of the materials utilized, particularly the composition of the added solid granularized or microsphere materials. While the microspheres or solid particles of carbon foams as exemplified above, and other forms of carbon, etc. will increase the electrical conductivity, metal and/or carbon fibers may be added for enhanced conductivity, and such may include nickel, stainless steel, aluminum, carbon, electroplated carbon fiber, etc.

The gels containing the granularized or microsphere materials, may for example, be formulated similar to those exemplified in Table 1 and the description thereof in above-referenced U.S. Pat. No. 5,260,855 and such is incorporated herein by reference thereto. In these examples, the granularized or microsphere materials may, for example, be composed of carbon aerogel, powdered Ni, or Nickel alloy activated carbon, or combinations thereof.

Powder particle size is preferably less than 100 $\mu$m, more preferably less then 50 $\mu$m, and most preferably less than 20 $\mu$m. Also, the particle size distribution should be great enough and of the right proportions to yield the maximum possible packing density of the composite. This can be done by mixing powders of two significantly different particle size differences together, thereby allowing the small particles to fill the voids of the large particles, and yielding a high density composite.

Following the drying operation the composite aerogels may be pyrolyzed in an inert atmosphere to produce composite carbon foam. By way of example, pyrolysis may be carried out in an atmosphere of nitrogen and temperature of 1050° C., for a time period of 4 hrs. Following pyrolysis the desired composite electrode configuration is formed.

The density of the composite carbon foam may be adjusted by altering the polymerization and/or drying conditions to affect solid volume fraction and/or pore size. By way of example, the density of the composite carbon foam may range from 0.05 to 1.0 g/cc and have a pore size of 0.010 to 25 $\mu$m.

In addition, the composite aerogel surface area and functionality can also be increased through the proper selection of purge gases employed during the pyrolysis cycle. Oxidizing gases such as carbon dioxide and air can be slowly purged through a tube furnace at 600–1200° C. to activate the composite aerogel or alter the reactivity/functionality of the composite aerogel surface area.

It has thus been shown that the present invention provides a composite carbon foam electrode which has enhanced performance over prior known carbon and carbon foam electrodes, as well as simplicity of fabrication. The electrode of this invention is useful in electrochemical energy storage applications, such as electrochemical double layer capacitors, lithium based battery insertion electrodes, fuel cell electrodes, and electrocapacitive deionization electrodes. The choice of materials utilized in the fabrication process, including the added granularized materials or microspheres, and/or fibers, will depend on the electrolyte used and the relative trade off of system resistivity and power to system energy. The method for producing the composite carbon foam electrode is generally similar to prior known carbon foam processes and may utilize the same materials and process procedure, except for the addition of the granulated materials, etc., prior to gelation, and the spreading, where desired, of the aerogel material during the drying phase of the method to form thin film sheets of the composite material.

While particular materials, process parameters, operation sequence of fabrication, etc. has been set forth to provide an understanding of the invention and its method of fabrication, such are not intended to be limiting. Modifications and changes may become apparent to those skilled in this field of technology, and it is intended that the invention be limited only by the scope of the appended claims.

We claim:

1. A capacitor having at least one electrode constructed of a composite carbon foam having a surface area between about 100 $m^2$/g to about 1200 $m^2$g.

2. The capacitor of claim 1, wherein the composite carbon foam is derived from the pyrolysis of mixtures of polyhydroxybenzene compounds that react in an appropriate ratio with formaldehyde and furfural, and a quantity of solid particles of selected materials.

3. The capacitor of claim 2, wherein the quantity of solid particles of selected materials is selected from the group consisting of carbon aerogel microspheres, crushed/powderized carbon aerogel, powderized activated or non-activated carbon, and metal and/or metal oxide powders or spheres.

4. The capacitor of claim 2, wherein the quantity of solid particles of selected materials is selected from the group of resorcinol/formaldehyde carbon foam particles, melamine/formaldehyde carbon foam particles, carbon microspheres, carbon aerogel microspheres, activated and non-activated carbon powders, carbon aerogel powder, PAN carbon particles, PMAN carbon particles, and graphitic carbon particles.

5. The capacitor of claim 2, wherein the quantity of solid particles of selected materials is selected from metal and/or carbon fibers to provide increased electrical conductivity, the metal and/or carbon fibers are selected from fiber composed of nickel, stainless steel, aluminum, carbon, and electroplated carbon.

6. The capacitor of claim 2, wherein the quantity of solid particles of selected materials is composed of carbon aerogel powders with binders including PTFE, EPDM, PMMA, PVDF, and other rubberized materials.

7. A capacitor having at least one electrode composed of a composite carbon foam derived from the pyrolysis of mixtures of granularized material, polyhydroxybenzene compounds, and formaldehyde or furfural, the composite carbon foam having a surface area between about 100 $m^2$/g to about 1200 $m^2$/g.

8. The capacitor of claim 7, wherein the composite carbon foam has a density of between about 0.1 g/cc to about 1.2 g/cc.

9. The capacitor of claim 7, wherein the granularized material is mixed with mixtures consisting of resorcinol/furfural, resorcinol/formaldehyde, phenol/resorcinol/formaldehyde, catechol/formaldehyde, and phloroglucinol/formaldehyde.

10. The capacitor of claim 7, wherein the granularized material is an electrically conductive material.

11. The capacitor of claim 10, wherein the electrically conductive material is composed of fibers selected from the group of metal and carbon.

12. The capacitor of claim 7, wherein the granularized material is selected from the group consisting of carbon aerogel microspheres, crushed/powderized carbon aerogel, powderized activated and non-activated carbon, and metal and/or metal oxide powders and spheres.

13. The capacitor of claim 7, wherein the granularized material is selected from the group of carbon foam, carbon, metals, carbon fibers, metal fibers, and carbon aerogels, and wherein said carbon fibers are selected from carbon and electroplated carbon, and wherein said metal fibers are selected from nickel and stainless steel.

* * * * *